(12) United States Patent
Kumar

(10) Patent No.: US 6,456,908 B1
(45) Date of Patent: Sep. 24, 2002

(54) TRACTION MOTOR SPEED SENSOR FAILURE DETECTION FOR AN AC LOCOMOTIVE

(75) Inventor: Ajith Kuttannair Kumar, Erie, PA (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 09/704,213

(22) Filed: Oct. 26, 2000

(51) Int. Cl.[7] .............................. G05D 1/00; G06F 7/00
(52) U.S. Cl. ............................ 701/19; 701/20; 701/29; 318/490
(58) Field of Search .................. 701/19, 20, 29; 318/490, 459, 52, 807, 565, 68; 104/307; 105/26.05, 49, 61; 700/45, 79; 290/3, 9, 45, 40 B, 40 C; 322/14, 16; 246/122 R

(56) References Cited

U.S. PATENT DOCUMENTS

| | | | | |
|---|---|---|---|---|
| 4,179,744 A | * | 12/1979 | Lowe | 701/35 |
| 4,243,927 A | | 1/1981 | D'Atre | 318/803 |
| 4,695,941 A | * | 9/1987 | Kumar | 700/45 |
| 5,392,716 A | * | 2/1995 | Orscheck et al | 105/61 |
| 5,629,567 A | * | 5/1997 | Kumar | 290/3 |
| 5,646,510 A | * | 7/1997 | Kumar | 322/16 |
| 5,990,648 A | | 11/1999 | Kumar et al. | 318/490 |
| 6,104,148 A | | 8/2000 | Kumar et al. | 318/52 |
| 6,243,628 B1 | * | 6/2001 | Bliley et al. | 701/29 |

* cited by examiner

Primary Examiner—Jacques H. Louis-Jacques
(74) Attorney, Agent, or Firm—Carl A. Rowold; Troy J. LaMontagne

(57) ABSTRACT

A system for detecting a failure of a speed sensor on a locomotive propelled by an AC traction motor is disclosed. The system includes a locomotive including a processor for executing a detection method. The method comprises conducting an evaluation of symptoms exhibited by a speed sensor. A health value representative of health of the speed sensor is generated and modified as a function of an evaluation, and as a result from the modification of the health value, a modified health value is generated. A motor control methodology responsive to the modified health value is selected.

84 Claims, 7 Drawing Sheets

TRACTION MOTOR SPEED SENSOR FAILURE DETECTION FOR AN AC LOCOMOTIVE

BACKGROUND

The invention relates to detection of a failure of a wheel speed sensor on a locomotive propelled by AC traction motors. Specifically, the invention is a method for determining the status of a group of speed sensors and establishing a hierarchy of resultant actions. Locomotives used for hauling applications are generally equipped with speed sensors coupled to respective traction motors or to the axles driven by the motors. The speed sensor data or information may be used to control various functions like torque production, adhesion optimization, as well as speed control and indication. The speed sensor data may also be utilized to detect a locked axle condition. Typically, in such locomotives, multiple inverters are connected to the same DC bus and such inverters may be used to drive one or more traction motors. When any one of the speed sensors fails it is possible to have the symptoms of the failure be detected by controllers of other axles causing them to shut down before the true symptom is detected. For example, if one of the speed sensors reads a low value of speed, the reference speed calculator will follow the erroneous low value input on the assumption that it is the true speed. Such a false reference following will cause all the axles to reduce torque as it would appear, though incorrectly, that the axles are slipping. This may result in the affected axle regenerating and driving power back into the DC bus. Similarly, all of the axles may be regenerating and thereby causing the DC bus voltage to be driven higher. This regeneration could cause a high voltage shut down condition. In addition, any motor controller could shut down because of an over-current especially in light of the devices typically having lower current rating as the voltage increases. The result of the above events would be to cause an improper inverter to shut down and an erroneous malfunction indication to a maintainer.

Over-voltages, over-currents, and erroneous failure indications result in costly efforts for maintainers. Thus, there is a need for a low-cost method to reliably determine when a speed sensor has failed.

SUMMARY

A system and method for detecting the failure of a speed sensor on a locomotive propelled by an AC traction motor. The system includes a locomotive including a processor for executing a detection method. The method comprises conducting an evaluation of symptoms exhibited by a speed sensor. A health value representative of health of the speed sensor is modified as a function of the evaluation and a modified health value is generated as a result from the modification of the health value. A motor control methodology is selected which is responsive to the modified health value.

A storage medium encoded with a machine-readable computer program code for detecting a failure of a speed sensor on a locomotive propelled by an AC traction motor, the storage medium including instruction for causing a controller to implement the disclosed method.

A computer data signal for detecting a failure of a speed sensor on a locomotive propelled by an AC traction motor, the computer data signal comprising code configured to cause a processor to implement the disclosed method.

BRIEF DESCRIPTION OF THE DRAWINGS

Referring now to the drawings wherein like elements are numbered alike in the several FIGURES.

DETAILED DESCRIPTION OF A PREFERRED EMBODIMENT

The present invention may be utilized in various types of alternating current (AC) induction motor powered vehicles such as, for example, transit cars and locomotives. A preferred embodiment of the invention, by way of illustration is described herein as it may be applied to a locomotive. While a preferred embodiment is shown and described, it will be appreciated by those skilled in the art that the invention is not limited to the detection of axle rotation but also to AC motors and devices powered by such.

Figure 1:
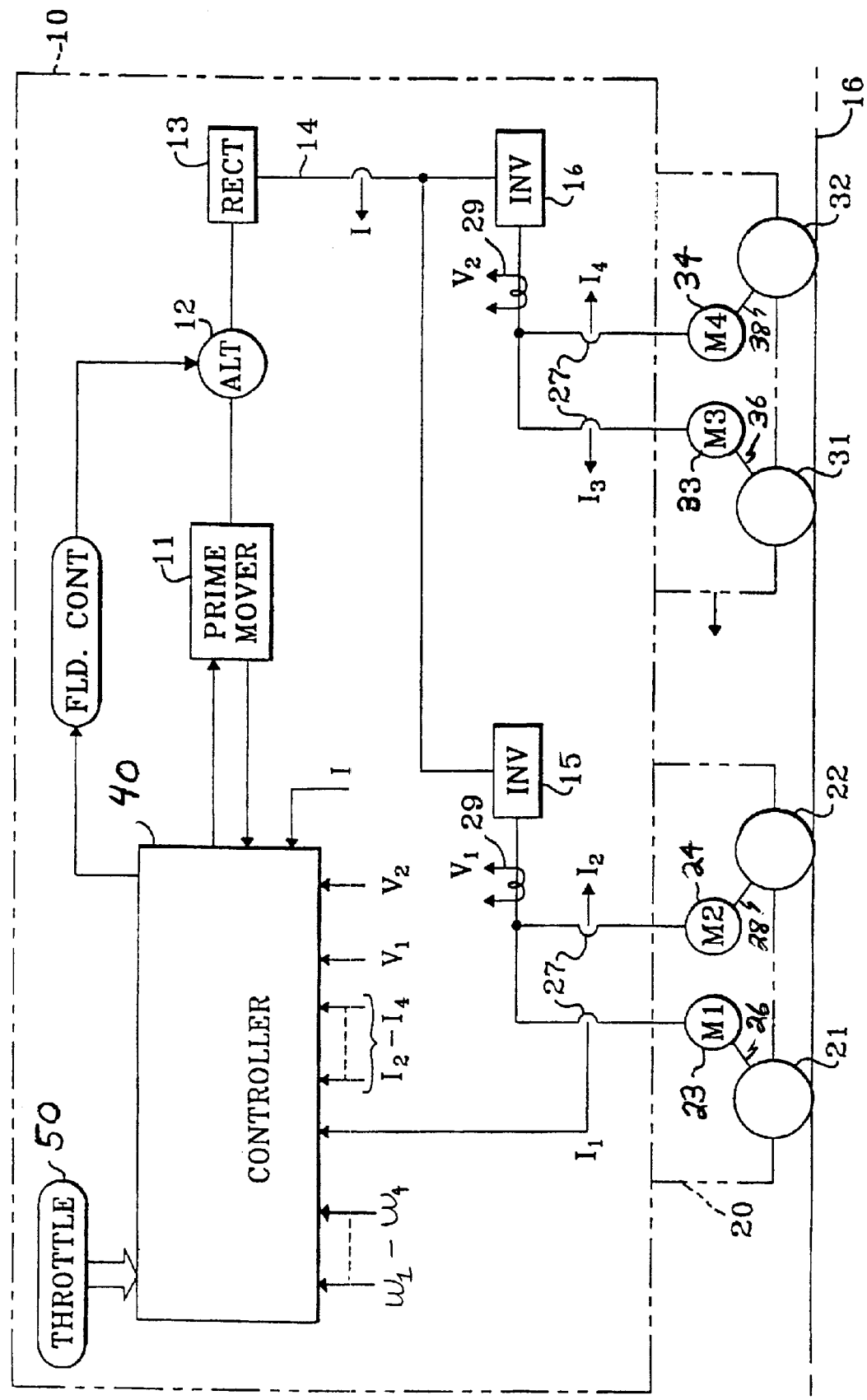
FIG. 1 depicts a simplified block diagram of a propulsion system and controller using a processor, such as may be used for executing the present invention.

A locomotive propulsion system 10 of FIG. 1 includes a variable speed prime mover 11 mechanically coupled to a rotor of a dynamo electric machine (e.g. alternator) 12 comprising a 3-phase AC synchronous generator or alternator. The 3-phase voltages developed by alternator 12 are applied to AC input terminals of a conventional power rectifier bridge 13. The direct current (DC) output of bridge 13 is coupled via DC link 14 to a pair of controlled inverters 15 and 16 that invert the DC power to AC power as a selectable variable frequency. The AC power is electrically coupled in energizing relationship to each of a plurality of adjustable speed AC traction motors M1 through M4 23, 24, 33, and 34. Prime mover 11, alternator 12, rectifier bridge 13 and inverters 15 and 16 respectively are mounted on a platform of the (not shown), such as a four-axle diesel-electric locomotive. The platform is in turn supported on two trucks 20 and 30, the first truck 20 having two axle-wheel sets 21 and 22 and the second truck 30 having two-axle-wheel sets 31 and 32.

Each of the traction motors M1–M4 23, 24, 33, and 34 is hung on a separate axle (not shown) with its rotor mechanically coupled via conventional gearing in driving relationship to the associated axle-wheel set 21, 22, 31, and 32. Further, coupled to each motor M1–M4 23, 24, 33, and 34 are motor speed sensors 26, 28, 36, and 38. Commonly, such sensor detects the rotation of the motor rotor, and is integral with the motor M1–M4 23, 24, 33, and 34, but, other sensors detecting the motor, gear train, axle or wheel speed are substantially similar and could provide equivalent information. In the illustrative embodiment, the two motors M1 23 and M2 24, and are electrically coupled in parallel with one another and receive power from inverter 15 while motors M3 33 and M4 34 are coupled to inverter 16. However, in some applications, it may be desirable to provide an inverter for each motor or to couple multiple motors to a single inverter. While four motors and axles sets are disclosed and discussed for illustrative purposes, it will be apparent that various numbers of motors or axle sets are within contemplation. For example, in an embodiment, six such motor and axle sets are employed. Suitable current transducers 17 and voltage transducers 18 are used to sense current and voltage signals representative of the magnitudes of the current and voltage applied to the motor stators respectively. For simplicity, only single lines have been indicated for power flow although it will be apparent that the motors M1–M4 23, 24, 33, and 34 are typically three phase motors so that each power line represents three lines in such applications.

The magnitude of output voltage and current supplied to the rectifier bridge 13 is determined by the magnitude of excitation current supplied to the field windings of the alternator 12. The excitation current is set in response to an operator demand (throttle 50) for vehicle speed by the controller 40. The controller 40 converts the speed command to a corresponding torque command for use in controlling the motors M1–M4 23, 24, 33, and 34. Since AC motor torque is proportional to rotor current and air gap flux, these quantities may be monitored; or, alternatively, other quantities such as voltage, current and motor RPM may be used to reconstruct motor torque in controller 40. A more detailed analysis of such techniques is given in U.S. Pat. No. 4,243,927.

Controller 40 may consist of, but not be limited to, one or more processors, memory, signal interfaces as necessary, arranged in a configuration to perform the computations required to execute the above mentioned locomotive speed control as well as various additional control and diagnostic functions or processes. Controller 40 may include numerous processes to provide for such functions. As is exemplified by the current invention, one such process 100 may be providing the processing for detecting the failure of a speed sensor. Controller 40 receives various input signals to facilitate such processing and may also provide output signals in response. Controller 40 may receive among others, the following: a signal representative of locomotive speed, such as may be readily obtained from one or more radar sensors or other vehicle speed sensors, signals representative of measured motor torque, voltage, current, flux as may be readily measured or calculated, and signals representative of the axle speeds. Controller 40 supplies as output signals: a signal representative of a desired motor speed which may be supplied to the inverter 15, 16 driving the motor M1–M4 23, 24, 33, and 34 coupled to the axle and information in connection with the status of the axle. Such information may be displayed by a suitable display (not shown) to inform an operator of the failed speed sensor condition so that appropriate corrective measures can be implemented. In addition, such information may also be transmitted to a fault storage unit for maintaining fault history on a given locomotive. As suggested above, controller 40 provides various control outputs generated to control one or more of the traction motors M1–M4 23, 24, 33, and 34. It will be appreciated that additional functions of controller 40 or separate controllers may be employed to provide respective control to other traction motors utilized in the locomotive.

It will be further appreciated that although the foregoing system will now be described in terms related to hardware components, such processor need not be limited to such hardware implementation since the operational relationships described herein may be readily implemented using software subroutines as may be executed in a suitable microprocessor system. Thus, such operational relationships may be readily implemented using discrete, or digitized signals and the operation of the system may be an iterative computational process.

An embodiment is disclosed providing a system and methodology facilitating identification of a speed sensor 26, 28, 36, and 38 failure and a process for motor control without utilization of speed sensor 26, 28, 36, and 38 information. The system and method entails a determination of the health of each speed sensor 26, 28, 36, and 38 employed by evaluating the symptoms exhibited by the system 10 and the signals from the motor speed sensors 26, 28, 36, 38.

Figure 2:
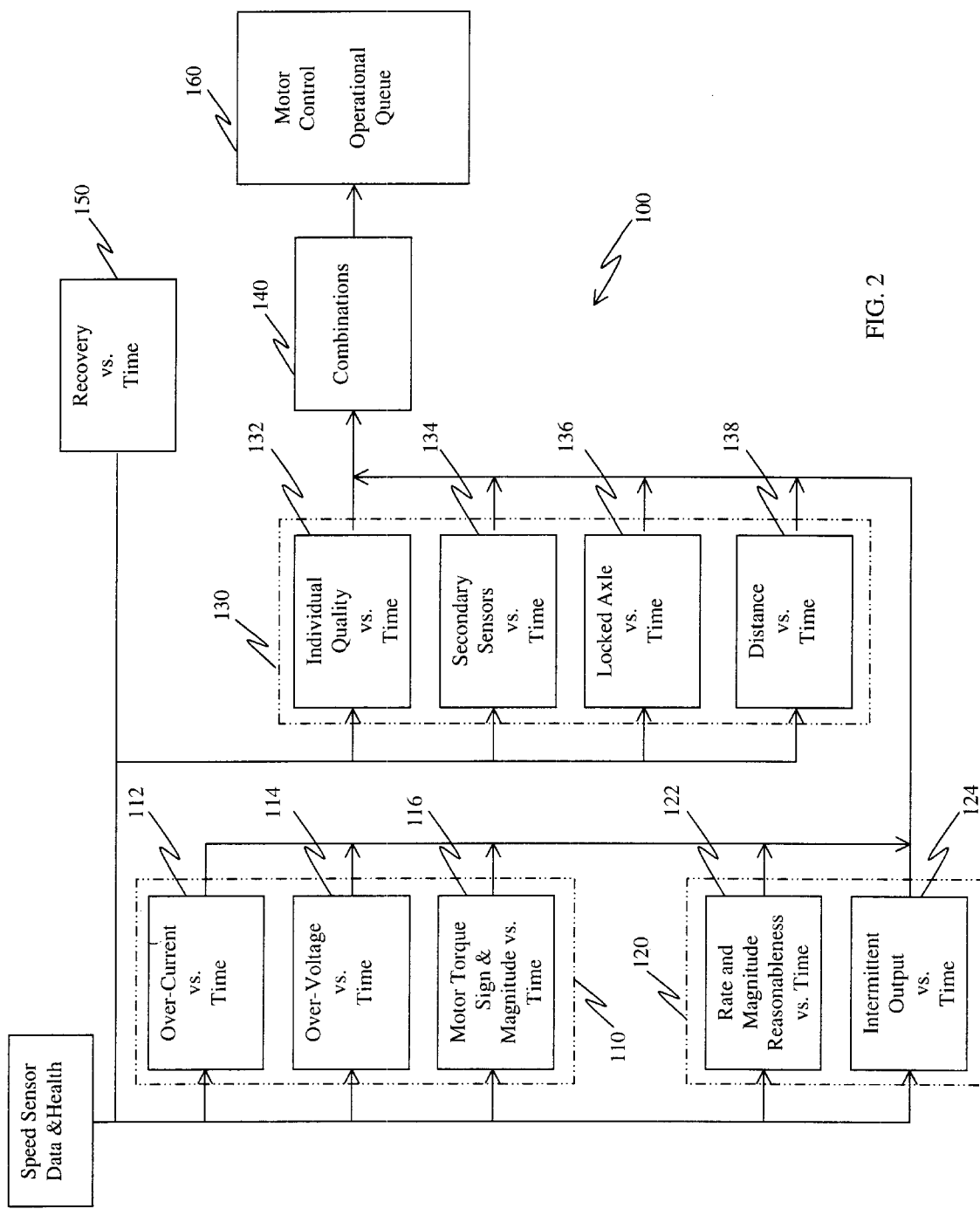
FIG. 2 depicts a flow diagram of the processes employed in an embodiment.

FIG. 2 depicts a flow diagram of an embodiment of the method and processing 100 for determining speed sensor status performed by controller 40 (FIG. 1). The evaluation tests may be taken in part or together to generate a speed sensor health variable for each speed sensor 26, 28, 36, and 38. From the speed sensor health variable value a determination of operational impact is made. FIG. 2 initially depicts the Indirect Evaluations 110 comprising the Over-Current evaluation 112, the Over-Voltage Evaluation 114, and the Motor Torque Sign/Magnitude 116, and Direction Evaluations 120. The processing further includes Direct Evaluations 120 comprising speed sensor signal value Rate and Magnitude Reasonableness 122, and Intermittent Output Tests 124. Finally, the processing includes Comparative Evaluations 130 including an Individual Signal Quality 132 relative to other speed sensors 26, 28, 36, and 38, Secondary Speed Sensors Reasonableness 134, potential Locked Axle 136 considerations, and a Distance Evaluation 138. In addition to evaluation of the various tests, the duration of the detected symptoms is also considered for each test.

Following the evaluation of each of the speed sensors 26, 28, 36, and 38, as described by the processes above, a determination of a sensor health is completed by a combination of the results from the several tests. Such a Combination 140 may be a total weighted sum of the results of the individual evaluations, a minimum value for all tests e.g, no combination at all, or a single variable representing the overall health status of the sensor modified by all of the evaluations of symptoms. As embodied, the Combined Evaluation 140 result utilizes a single health variable. It will be apparent now, that those skilled in the art may conceive of numerous possible combining methodologies for various sensor tests to achieve an overall speed sensor health.

The speed sensor health once evaluated is utilized to identify the appropriate course of action for vehicle control. In an embodiment, a hierarchy of several levels is established in the Motor Control Queue handling process 160 defining certain aspects of vehicle control as well operational characteristics as a function of the sensor status. A status queue where the motor control operation for a particular motor (M1–M4 23, 24, 33, and 34) is determined by the status of the health of the speed sensor 26, 28, 36, and 38 (among other criteria). The status queue tracks the validity of sensor data for each motor control function and dictates the operational characteristics for each motor 26, 28, 36, and 38 as a function of that data. As various sensors' characteristics change, the queue shifts the operational mode of the affected motor 26, 28, 36, and 38 to compensate accordingly. At a first level, the particular control algorithm operates without a speed sensor input by utilizing information provided by other sources. Such a methodology for motor control, without a sensing motor speed, is termed Reference Tachometer-less Control (RTC), and is disclosed and discussed in U.S. Pat. No. 6,104,148. RTC operation comprises operating a particular motor utilizing the speed sensor reference from another source, commonly another axle. As embodied, RTC operation is constrained to allow operation via a reference sensor provided there exists a separate, operational speed sensor available. A second level of operation may be employed, for example, if the first is unavailable, where operation of a particular axle without a speed sensor 26, 28, 36, and 38 is not possible and prevented. Finally, at a third level, a maintainer is notified of the condition, and directed to perform maintenance functions. Further detail of the queue functionality will be provided in a later discussion.

Having addressed the overall evaluations 110–160, attention may now be given to the details of each of the evaluations of each type for a more complete understanding. The Indirect Evaluations 110 are those types of symptom evaluations that are not direct indications of a sensor failure, but instead provide an indication that the sensor of interest may not be performning to specification. Three such indirect evaluations are disclosed, however, many such evaluations may be available depending upon the sensors and secondary processing employed. Certain other symptoms may manifest themselves in a manner that yields additional evaluations.

Figure 3:
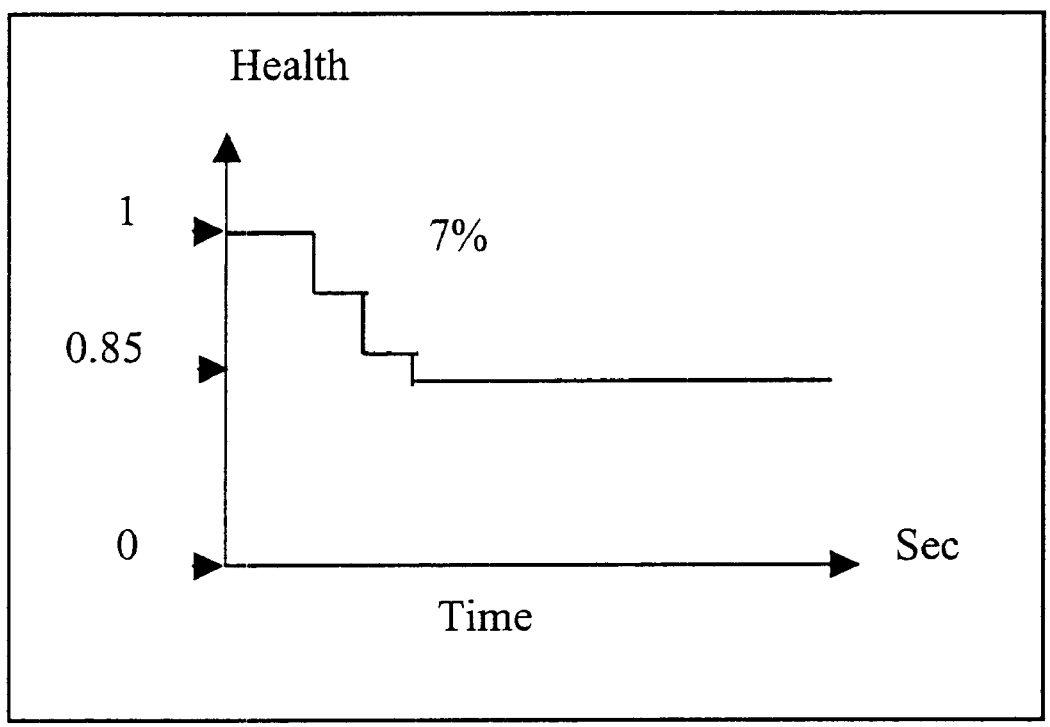
FIG. 3 depicts a profile of the speed sensor health as a function of the duration of an over-current condition for a speed sensor.

Looking first to the Over-Current Evaluation 112, excessive motor current and its duration are provided consideration. The electrical frequency applied to the traction motor (one of M1–M4 23, 24, 33, 34) is typically the sum of motor speed as detected by speed sensor 26, 28, 36, and 38 and slip command. The slip command is proportional to the desired torque, while the motor speed is as sensed or determined as described earlier. If the motor speed utilized is in error, then the actual slip will likewise be in error, thereby causing high current to flow. However, in motor operation, speed sensor error may not be the only cause of high currents. Other disturbances or failures, for example, a failed current sensor, inoperative power switches, or malfunctions of software or hardware may also cause high currents in error. Therefore, for every instant of an over current detection the value for speed sensor health is reduced by a small increment if the speed sensor health is above a specified threshold. FIG. 3 depicts a profile of the speed sensor health as a function of the duration of an over-current condition. For each occurrence of an over-current the speed sensor health value is reduced by 7 percent to a minimum level of 85 percent. This value has been selected as adequate to enable RTC operation (level 1) yet not trigger the priority status (level 2). It is noteworthy to recognize that these criteria are established based on a preference to attempt RTC operation in the presence of an over-current. Should the over-current persist even while under RTC operation, then the speed sensor is most likely not the cause of the fault, and existing motor control diagnostics would address the over-current fault.

Moving now to the Over-Voltage Evaluation 114, to address when a speed sensor 26, 28, 36, and 38, perhaps for a particular axle (one of 21, 22, 31, and 32) in a locomotive, fails in such a way as to cause the commanded electrical frequency to decrease slightly. Thereby, resulting in a motor (one of M1–M4 23, 24, 33, 34) producing a braking torque (but not enough to cause over current, described above) with the resulting braking energy being transmitted back to the DC link 14. If the motors for other axles 21, 22, 31, and 32 do not consume this power then the DC link 14 voltage may rise to the point of causing an over-voltage condition. In this case, all the axles 21, 22, 31, and 32 will encounter the over-voltage, but will be unable to determine which, if any, speed sensor 26, 28, 36, and 38 caused the problem. However, similar to the over-current case, an over-voltage may also be caused by other non-speed sensor related reasons. Likewise, as with the over-current evaluation, for every occurrence of an over-voltage detection the value for speed sensor health is reduced by a small amount if the speed sensor health is above a specified threshold. Again, the speed sensor health value reduction need only be sufficient to enable RTC operation (level 1) yet not trigger the priority status (level 2). Similarly, it is noteworthy that these criteria are established based on a preference to attempt RTC operation in the presence of an over-voltage. Should the over-voltage persist even while under RTC operation, then the speed sensor is most likely not the cause of the fault, and existing motor control diagnostics would address the over-voltage fault.

The final Indirect Evaluations 110 to be considered is the evaluation Motor Torque Sign/Magnitude 116. When incorrect speed information is used for motor control, the resulting torque (magnitude or direction or both) will be different from the required torque. As with previous evaluations such differences may also be resultant from other causes. Similar to the over-current and over-voltage conditions, for every occurrence of a detected incorrect torque sign, magnitude, or both, the value of speed sensor health is reduced by a small amount if the speed sensor health is above a specified threshold. Once again, this value has been selected as adequate to enable RTC operation (level 1) yet not trigger the priority status (level 2).

Figure 4:
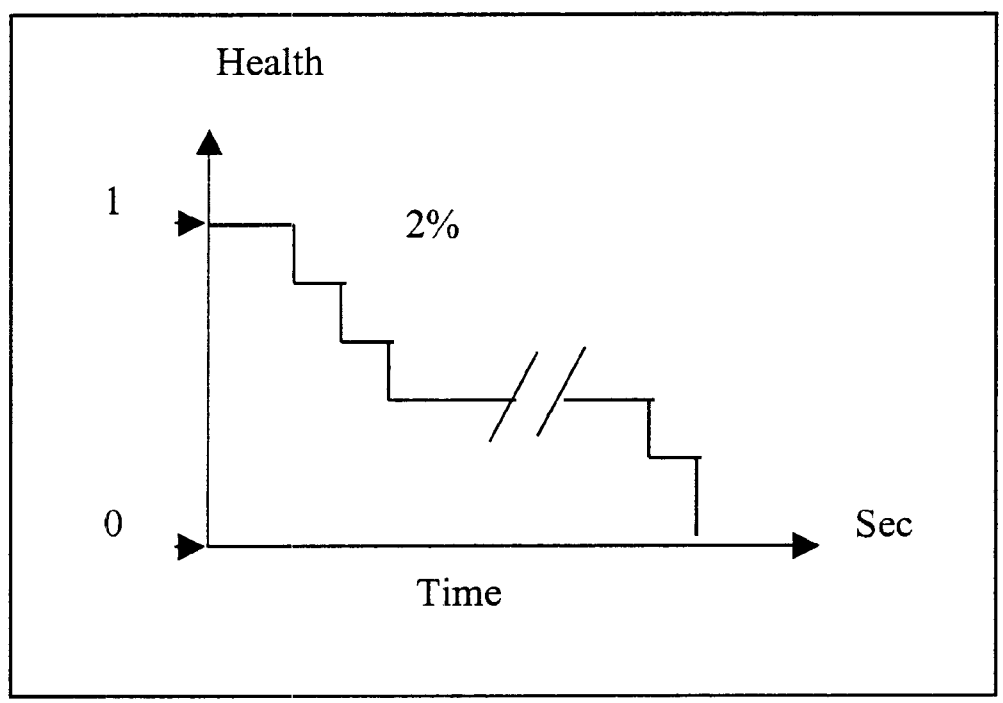
FIG. 4 depicts a profile of the speed sensor health as a function of the duration of an excessive rate fault condition for a speed sensor.

Turning now to the Direct Evaluations 120, of speed sensor failure. Direct Evaluations 120 are evaluations, which alone are indicative of a failure of the sensor and may require little or no further comparison to ascertain that a failure has occurred. While two such Direct Evaluations 120 have been disclosed, additional evaluations may be contemplated now based upon the particular characteristics of the sensor or processing employed. The first Direct Evaluation 120 is the Rate and Magnitude Reasonableness 122. The speed of a vehicle generally does not change at a high rate. Typically, for example, due to the inertia of the overall system a locomotive axle will not experience speed changes in excess of 300–400 RPM in a second. Therefore, it can be assumed that if there is a sudden change in speed computed from the speed sensor 26, 28, 36, and 38 beyond the expected extremes, this information most likely indicates a failure of a speed sensor 26, 28, 36, and 38 or associated circuits unless there is also a major motor failure. For every occurrence of a high rate of change of speed feedback the value of speed sensor health is reduced by a small amount. FIG. 4 depicts a profile of the speed sensor health as a function of the duration of an excessive rate fault condition for a speed sensor 26, 28, 36, and 38. For each occurrence, the speed sensor health value is reduced by 2 percent. This value has been selected as adequate to enable RTC operation (level 1) relatively quickly, and then trigger the priority status (level 2) if necessary. It is noteworthy to recognize that these criteria are established based on a preference to attempt RTC operation in the presence of a fault.

Continuing with the speed sensor Intermittent Output Evaluation 124, where if the output of the speed sensor 26, 28, 36, and 38 is intermittent (as indicated by periods during which the speed indication is zero or very close to zero following operation at a higher speed), such information directly indicates a failure of a speed sensor or associated circuits unless there is a major motor failure. For every occurrence of a zero or near zero value from the speed sensor, the value of speed sensor health is reduced by a small amount, similar to High Rate of Change indication.

Figure 5:
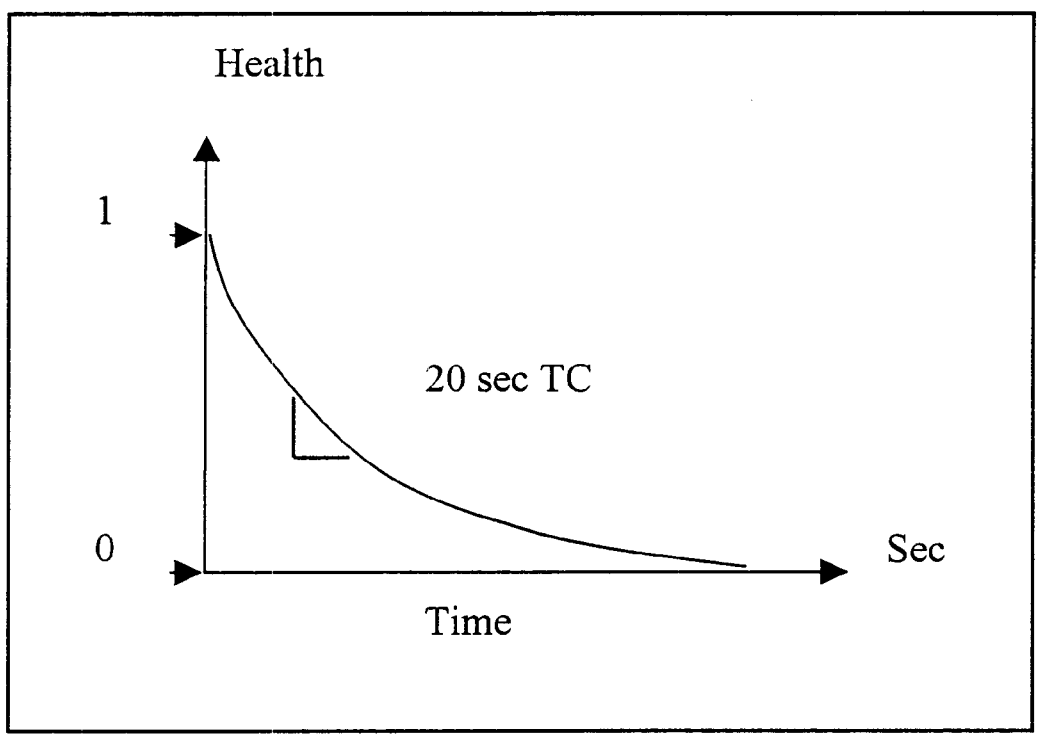
FIG. 5 depicts a profile of the speed sensor health as a function of the duration of an individual signal fault condition of a speed sensor.

Turning now to the Comparative Evaluations 130 where speed sensors 26, 28, 36, and 38 are evaluated against other speed sensing devices or processes. Each of the Comparative Evaluations 130 utilizes secondary information to aid in a determination of a health of a speed sensor. While several such comparative evaluations have been disclosed in a manner related to locomotives and the information available therefrom, it will be appreciated that numerous variation of such evaluations may be available dependent upon the portfolio of information available. The first such Comparative Evaluations 130 is an Individual Signal Quality Evaluation 132. Under typical operational conditions, the speeds detected by each of the speed sensors 26, 28, 36, and 38 should be relatively similar. For example, on a locomotive, all of the axles on a locomotive are substantially same (except for a scale factor due to any wheel diameter differences which can be calibrated for). Therefore, the speeds detected for each of the axles should be substantially similar. However, if a particular axle speed sensor value exhibits noticeably different characteristics (for example: much higher rate of change) than all the others, it would be indicative of a probable failure of that speed sensor (as opposed to all of the other speed sensors having failed). Whenever such a condition is encountered, the value of speed sensor health is reduced. FIG. 5 depicts a profile of the speed sensor health as a function of the duration of an individual signal fault condition of a speed sensor. An exponentially decaying profile employing about a 20 second time constant ensures a more rapid reduction to enable RTC operation (level 1) or to trigger the priority status (level 2) yet providing a substantially longer time period before indicating a requirement for maintenance (level 3).

A second Comparative Evaluations 130 is that of Secondary Speed Sensor Reasonableness 134 where auxiliary sensors are employed as a reference to evaluate the detected axle speeds form the speed sensor 26, 28, 36, and 38. A reference speed may be derived for example from all other axles (e.g., those not being evaluated) and/or other devices and inputs such as RADAR, Global Positioning System (GPS) and the like. If an axle speed is differs significantly from a locomotive reference speed, then the speed sensor 26, 28, 36, and 38 may be faulty. Should such a condition be observed, the value of speed sensor health is reduces in a similar to the speed sensor Individual Quality Evaluation 132, but at a faster rate. Again an exponentially decaying profile ensures a rapid reduction to enable RTC operation (level 1) or to trigger the priority status (level 2). A smaller time constant indicates a more rapid reduction in the value of speed sensor health. A more rapid decay is employed because the Secondary Reasonableness Evaluation 134, which is a more direct reference evaluation provides a better indication for the potential of a speed sensor fault than may be provided by an Individual signal Quality Evaluation 132, which is a more dynamic or transient evaluation.

Figure 6:
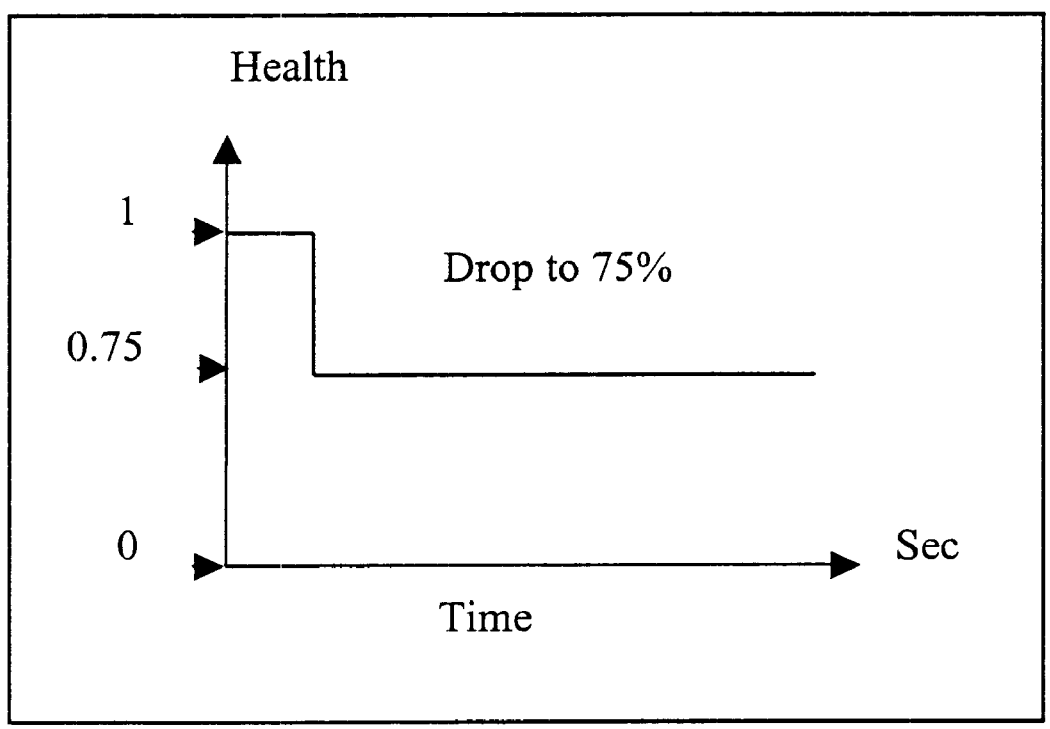
FIG. 6 depicts a profile of the speed sensor health as a function of the duration of a locked axle condition for a speed sensor.

In a third Comparative Evaluations 130, a Locked Axle Evaluation 136 determines from the speed sensors 26, 28, 36, and 38 if conditions similar to a locked axle are being exhibited. Such conditions are identified if a particular speed sensor (one of 26, 28, 36, and 38) for an axle is indicating a speed below a certain threshold and all other axles are operating at speeds consistently above a different threshold for a predetermined period of time. Under such conditions, the value of speed sensor health is reduced to a predetermined level if it is above the value, and unchanged if it is already at of below the predetermined level. FIG. 6 depicts a profile of the speed sensor health as a function of the duration of a locked axle like condition for a speed sensor 26, 28, 36, and 38. Table 1 identifies the conditions and durations and thresholds for applicable to the Locked Axle Evaluation 136. The predetermined level is set such that this axle gets into the RTC queue with a much higher priority (level 2) and thus prevents the unnecessary logging of a locked axle fault (via normal control diagnostics) if the only failure is that of a speed sensor 26, 28, 36, and 38. An actual locked axle fault indication dictates that the operator must stop the locomotive and inspect the afflicted axle. Therefore, avoiding an unnecessary locked axle fault is highly desirable in that it avoids the potential for stopping the vehicle unnecessarily.

TABLE 1

| Locked Axle Evaluation | | |
|---|---|---|
| Measured Speed | Reference Speed | Duration |
| <1 mph | >4 mph | 9 seconds |
| <2 mph | >8 mph | 3 seconds |

Where Speed is in miles per hour (mph) and the Duration is in seconds. The Reference Speed being a combination of various known good speed sensors which may include other speed sensors from other axles, and other vehicle speed sensing devices.

Figure 7:
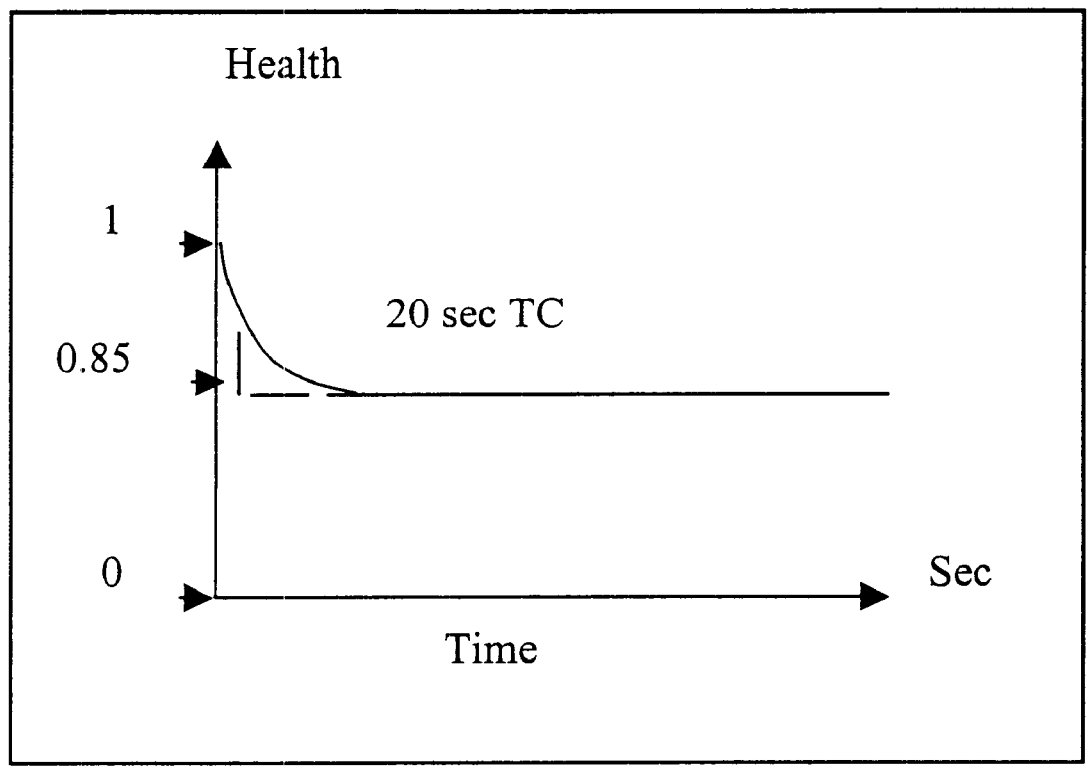
FIG. 7 depicts a profile of the speed sensor health as a function of the duration of a calculated distance error for a speed sensor.

The final Comparative Evaluations 130 is a Distance Evaluation 138. At low operational speeds of the locomotive, especially under starting conditions, if a speed sensor 26, 28, 36, and 38 fails (example a failure at 0 speed), the failed speed sensor may not be detected by the above described methods a until the locomotive attains a reasonable speed. The process calculates the distance traveled utilizing the speed sensor information over a predetermined duration. A distance error is determined when there is a calculated distance for a particular speed sensor in excess of that calculated for other speed sensors. A distance error is also an indication of a failed speed sensor. In an embodiment, the Distance Evaluation 138 is a process which calculates the distance traveled via a particular speed sensor being evaluated if it is measuring less than 1 mph (mile per hour), while other speeds are between 0.5 and 4 mph. A fault is determined if the integral of difference between other measured speeds and the evaluated speed exceeds 30 mph*seconds. FIG. 7 depicts a profile of the speed sensor health as a function of the duration of a calculated distance error for a speed sensor 26, 28, 36, and 38. Whenever this condition is present, if the speed sensor health is above the threshold, then health is reduced to a predetermined level in a fashion similar to sensor Individual Quality Evaluation 132, but to a minimum threshold. An exponentially decaying profile employing about a 20 second time constant limited to a maximum reduction of 15 percent ensures a rapid reduction to enable RTC operation (level 1) yet avoids unnecessarily triggering the priority status (level 2).

Following the evaluation of each of the speed sensors 26, 28, 36, and 38, as described by the evaluations above 112–138, a determination of a speed sensor health is completed by a combination of the results from the several tests. Such a Combination 140 may be a total weighted sum of the results of the individual evaluations, a miminum value for all tests (no combination at all), or a single variable representing the overall health status of the sensor modified by all of the evaluations of symptoms. As embodied, the Combined Evaluation 140 result utilizes a single health variable subject to modification by all the symptoms. This embodiment provides for a relatively simple process, which may be easily implemented. It may be appreciated that while a single health variable has been chosen for an embodiment, numerous variations are reasonable within the constraints typical of a given implementation.

It should be noted that the disclosure primarily addresses the reduction of the value of speed sensor health as a function of evaluation speed sensor fault symptoms. In a like manner, the value of speed sensor health may be configured to recover when evaluation of speed sensors indicates the absence of a fault. In an embodiment, the Recovery Process 150 addresses such a state. In an exemplary embodiment, if all the abovementioned conditions are absent, and if all the speeds are above a threshold, then the speed sensor health is increased back to 100 percent at a specified rate. It follows, that the conditions for increasing the speed sensor health may be different or more stringent than just the absence of fault conditions. In an embodiment, the Recovery Process 150 increases the speed sensor health value employing an exponential growth and a resetable time constant of about one hour. A very long recovery time ensures that the speed sensor health is not recovered via brief periods of proper operation. It is also noteworthy to recognize that the Recovery Process 150 enables a maintainer to reset the speed sensor health to 100 percent following maintenance actions. It will be appreciated that the Recovery Process 150 could address individual evaluations 112–138, or a set of evaluations, all of Indirect Evaluations 110 for example, in a different manner. In the embodiment disclosed a single criterion is employed providing relative simplicity and more stringent recovery constraints.

The value for speed sensor health once determined is utilized to identify the appropriate course of action for vehicle control. In an embodiment, several levels of hierarchy are established in the Motor Control Queue handling process 160 defining certain aspects of a vehicle motor control methodology as well operational characteristics as a function of the sensor status. It is significant to recognize that while three levels of hierarchy are disclosed and considered, now any number of variations would be reasonably within the conception of those skilled in the art.

At a first level, the particular control algorithm operates without a speed sensor input by utilizing information provided by other sources, namely other axles. If a speed sensor health falls below a first threshold, for example about 95 percent, then control for that axle, will be transitioned to RTC (control without speed sensor), provided the number of axles simultaneously employing RTC control does not exceed a predetermined limit. In an embodiment employing six axles, a maximum of three axles are allowed to operate under RTC. However, it would be conceivable to operate such a locomotive with up to five axles employing RTC (leaving at least one axle with a speed sensor that is operational) or some secondary speed sensing capability. It is noteworthy to appreciate that operation under such conditions may be limited depending upon the particular sensor or sensors 26, 28, 36, and 38 (or others in a six axle embodiment) that have exhibited failure symptoms.

A second level of operation may be employed, for example, if the first is unavailable, that is, in this case, where RTC is not possible because too many axles are already employing RTC. In an embodiment, if an axle exhibits a speed sensor health that falls below a second threshold, for example about 76 percent, then that particular axle may be given a priority status for RTC control. Meanwhile, other axles with speed sensor health value above the second threshold may be removed the RTC queue. That is, for example, in an embodiment employing 6 axles (rather than 4 as depicted in FIG. 1), if three of the axles are already in the queue and operating under RTC, should a fourth speed sensor have a health value fall below about 76 percent, then that axle is assigned priority and operated under RTC. At the same time because of the three axle limit discussed earlier, one of the axles operating under RTC control may be removed and then not utilized. Those skilled in the art will appreciate that various methods of enabling entry and priority to the queue for RTC operation or priority may be established. While the thresholds of 95 percent and 76 percent have been discussed, numerous variations are possible. In a preferred embodiment, these thresholds have been selected to ensure rapid transition to RTC and priority assignment in advance of triggering a locked axle annunciation to the operator. U. S. Pat. No. 5,990,648 addresses additional testing which may be performed in anticipation of a locked axle condition to ensure a locked axle annunciation is necessary. Other criteria for establishing the thresholds, perhaps for example, as a function of other operational characteristics would be conceivable to those skilled in the art. While an illustrative example of a six axle locomotive is provided any variation would be understood as being within the scope and breadth of the invention. For example, entry to the queue or priority could be a function of the particular evaluations, thereby, assigning weight or preference to certain evaluations. Further, priority might be assigned as a function of a combination of symptoms or the duration of a particular symptom.

Finally, at a third level, should the speed sensor health value decline to a much lower limit, for example approximately 5 percent, then the maintainer is notified of the condition, and directed to perform maintenance functions such as repair or replacement of the speed sensor 26, 28, 36, and 38. Again, the 5 percent threshold has been selected as adequate to provide information to maintenance personnel indicating that there is a high likelihood of one or more failed components.

The disclosed invention may be embodied in the form of computer-implemented evaluations and apparatuses for practicing those evaluations. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood by a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A method for detecting a failure of a speed sensor on a locomotive propelled by an AC traction motor, the method comprising:

conducting at least one evaluation of symptoms exhibited by a speed sensor;

modifying at least one health value representative of health of said speed sensor as a function of said at least one evaluation;

generating at least one modified health value as resultant from said modifying; and selecting a motor control methodology responsive to said at least one modified health value.

2. The method of claim 1 wherein said modifying comprises a duration based reduction in said at least one health value.

3. The method of claim 1 wherein said modifying is characterized by a reduction of said at least one health value via a predetermined process for each at least one evaluation.

4. The method of claim 1 wherein said selecting is characterized by transitioning motor control to speed sensorless control when said at least one modified health value decreases below a threshold of about 95 percent.

5. The method of claim 1 wherein said selecting is characterized by transitioning motor control to speed sensorless control with priority when said at least one modified health value decreases below a threshold of about 76 percent.

6. The method of claim 1 wherein said selecting is characterized by transitioning motor control to speed sensorless control and informing that maintenance is required when said at least one modified health value decreases below a threshold of about 5 percent.

7. The method of claim 1 wherein said at least one evaluation is characterized by an indirect evaluation.

8. The method of claim 7 wherein said indirect evaluation is characterized by an over-current evaluation.

9. The method of claim 7 wherein said indirect evaluation is characterized by an over-voltage evaluation.

10. The method of claim 7 wherein said indirect evaluation is characterized by a motor torque sign and magnitude evaluation.

11. The method of claim 1 wherein said at least one evaluation is characterized by a direct evaluation.

12. The method of claim 11 wherein said direct evaluation is characterized by a rate and magnitude reasonableness evaluation.

13. The method of claim 11 wherein said direct evaluation is characterized by an intermittent output evaluation.

14. The method of claim 1 wherein said at least one evaluation is characterized by a comparative evaluation.

15. The method of claim 14 wherein said comparative evaluation is characterized by an individual signal quality evaluation.

16. The method of claim 14 wherein said comparative evaluation is characterized by a secondary sensor reasonableness evaluation.

17. The method of claim 14 wherein said comparative evaluation is characterized by a locked axle evaluation.

18. The method of claim 14 wherein said comparative evaluation is characterized by a distance evaluation.

19. The method of claim 1 further comprising a recovery process of said at least one health value if said at least one evaluation indicates absence of said failure of said speed sensor.

20. The method of claim 1 further including combining said at least one health value with at least one other health value.

21. The method of claim 20 wherein said combining is characterized by a weighted sum of said at least one health value and said at least one other health value.

22. The method claim 20 wherein said combining is characterized by individual consideration of a threshold for at least one of each said at least one health value and each said at least one other health value.

23. The method claim 20 wherein said combining is characterized by a composite health value subject to modification by each of said at least one evaluation.

24. The method of claim 20 wherein said modifying comprises a duration based reduction of at least one of said at least one health value and said at least one other health value.

25. The method of claim 20 wherein said modifying is characterized by a reduction of at least one of said at least one health value said at least one other health value.

26. The method of claim 20 wherein said selecting is characterized by transitioning motor control to speed sensorless control when said at least one modified health value decreases below a threshold of about 95 percent.

27. The method of claim 20 wherein said selecting is characterized by transitioning motor control to speed sensorless control with priority when said at least one modified health value decreases below a threshold of about 76 percent.

28. The method of claim 20 wherein said selecting is characterized by transitioning motor control to speed sensorless control and informing an operator that maintenance is required when said at least one modified health value decreases below a threshold of about 5 percent.

29. The method of claim 20 wherein said at least one evaluation is characterized by an indirect evaluation.

30. The method of claim 29 wherein said indirect evaluation is characterized by an over-current evaluation.

31. The method of claim 30 wherein said indirect evaluation is characterized by a motor torque sign and magnitude evaluation.

32. The method of claim 29 wherein said indirect evaluation is characterized by an over-voltage evaluation.

33. The method of claim 20 wherein said at least one evaluation is characterized by a direct evaluation.

34. The method of claim 33 wherein said direct evaluation is characterized by a rate and magnitude reasonableness evaluation.

35. The method of claim 33 wherein said direct evaluation is characterized by an intermittent output evaluation.

36. The method of claim 20 wherein said at least one evaluation is characterized by a comparative evaluation.

37. The method of claim 36 wherein said comparative evaluation is characterized by an individual signal quality evaluation.

38. The method of claim 36 wherein said comparative evaluation is characterized by a secondary sensor reasonableness evaluation.

39. The method of claim 36 wherein said comparative evaluation is characterized by a locked axle evaluation.

40. The method of claim 36 wherein said comparative evaluation is characterized by a distance evaluation.

41. The method of claim 20 wherein said selecting is characterized by transitioning motor control to speed sensorless control when said at least one modified health value decreases below a selected threshold.

42. The method of claim 1 wherein said selecting is characterized by transitioning motor control to speed sensorless control when said at least one modified health value decreases below a selected threshold.

43. A system for detecting a failure of a speed sensor on a locomotive propelled by an AC traction motor, the system comprising:

a locomotive propulsion system including a traction motor connected to an axle in a driving relationship;

a speed sensor configured to detect a rotational speed of said traction motor;

a controller coupled to said speed sensor and said motor;

wherein said controller performs processing to carry out a method of:

conducting at least one evaluation of symptoms exhibited by a speed sensor;

modifying at least one health value representative of health of said speed sensor as a function of said at least one evaluation;

generating at least one modified health value resultant from said modifying; and selecting a motor control methodology responsive to said at least one modified health value.

44. The system of claim 43 wherein said modifying comprises a duration based reduction in said at least one health value.

45. The system of claim 43 wherein said modifying is characterized by a reduction of said at least one health value via a predetermined process for each at least one evaluation.

46. The system of claim 43 wherein said selecting is characterized by transitioning motor control to speed sensorless control when said at least one modified health value decreases below a threshold of about 95 percent.

47. The system of claim 43 wherein said selecting is characterized by transitioning motor control to speed sensorless control with priority when said at least one modified health value decreases below a threshold of about 76 percent.

48. The system of claim 43 wherein said selecting is characterized by transitioning motor control to speed sensorless control and informing an operator that maintenance is required when said at least one modified health value decreases below a threshold of about 5 percent.

49. The system of claim 43 wherein said at least one evaluation is characterized by an indirect evaluation.

50. The system of claim 49 wherein said indirect evaluation is characterized by an over-current evaluation.

51. The system of claim 49 wherein said indirect evaluation is characterized by an over-voltage evaluation.

52. The system of claim 49 wherein said indirect evaluation is characterized by a motor torque sign and magnitude evaluation.

53. The system of claim 43 wherein said at least one evaluation is characterized by a direct evaluation.

54. The system of claim 53 wherein said direct evaluation is characterized by a rate and magnitude reasonableness evaluation.

55. The system of claim 53 wherein said direct evaluation is characterized by an intermittent output evaluation.

56. The system of claim 43 wherein said at least one evaluation is characterized by a comparative evaluation.

57. The system of claim 56 wherein said comparative evaluation is characterized by an individual signal quality evaluation.

58. The system of claim 56 wherein said comparative evaluation is characterized by a secondary sensor reasonableness evaluation.

59. The system of claim 56 wherein said comparative evaluation is characterized by a locked axle evaluation.

60. The system of claim 56 wherein said comparative evaluation is characterized by a distance evaluation.

61. The system of claim 43 further comprising a recovery process of said at least one health value if said at least one evaluation indicates absence of said failure of said speed sensor.

62. The system of claim 43 further including combining said at least one health value with at least one other health value.

63. The system of claim 62 wherein said combining is characterized by a weighted sum of said at least one health value and said at least one other health value.

64. The system claim 62 wherein said combining is characterized by individual consideration of a threshold for at least one of each said at least one health value and each said at least one other health value.

65. The system claim 62 wherein said combining is characterized by a composite health value subject to modification by each of said at least one evaluation.

66. The system of claim 62 wherein said modifying comprises a duration based reduction of at least one of said at least one health value and said at least one other health value.

67. The system of claim 62 wherein said modifying is characterized by a reduction of at least one of said at least one health value said at least one other health value.

68. The system of claim 62 wherein said selecting is characterized by transitioning motor control to speed sensorless control when said at least one modified health value decreases below a threshold of about 95 percent.

69. The system of claim 62 wherein said selecting is characterized by transitioning motor control to speed sensorless control with priority when said at least one modified health value decreases below a threshold of about 76 percent.

70. The system of claim 62 wherein said selecting is characterized by transitioning motor control to speed sensorless control and informing an operator that maintenance is required when said at least one modified health value decreases below a threshold of about 5 percent.

71. The system of claim 62 wherein said at least one evaluation is characterized by an indirect evaluation.

72. The system of claim 71 wherein said indirect evaluation is characterized by an over-current evaluation.

73. The system of claim 71 wherein said indirect evaluation is characterized by an over-voltage evaluation.

74. The system of claim 71 wherein said indirect evaluations is characterized by a motor torque sign and magnitude evaluation.

75. The system of claim 62 wherein said at least one evaluation is characterized by a direct evaluation.

76. The system of claim 75 wherein said direct evaluation is characterized by a rate and magnitude reasonableness evaluation.

77. The system of claim 75 wherein said direct evaluation is characterized by an intermittent output evaluation.

78. The system of claim 62 wherein said at least one evaluation is characterized by a comparative evaluation.

79. The system of claim 78 wherein said comparative evaluation is characterized by an individual signal quality evaluation.

80. The system of claim 78 wherein said comparative evaluation is characterized by a secondary sensor reasonableness evaluation.

81. The system of claim 78 wherein said comparative evaluation is characterized by a locked axle evaluation.

82. The system of claim 78 wherein said comparative evaluation is characterized by a distance evaluation.

83. The system of claim 62 wherein said selecting is characterized by transitioning motor control to speed sensorless control when said at least one modified health value decreases below a selected threshold.

84. The system of claim 43 wherein said selecting is characterized by transitioning motor control to speed sensorless control when said at least one modified health value decreases below a selected threshold.

* * * * *